(12) United States Patent
Cottone

(10) Patent No.: US 6,550,741 B1
(45) Date of Patent: Apr. 22, 2003

(54) HIGH LOAD CAPACITY CRADLE PARTICULARLY FOR ROLLS AND COILS

(75) Inventor: Mark A. Cottone, West Chicago, IL (US)

(73) Assignee: Cougar Package Designers, Inc., West Chicago, IL (US)

( * ) Notice: Subject to any disclaimer, the term of this patent is extended or adjusted under 35 U.S.C. 154(b) by 0 days.

(21) Appl. No.: 09/679,735

(22) Filed: Oct. 5, 2000

Related U.S. Application Data

(60) Provisional application No. 60/157,971, filed on Oct. 6, 1999.

(51) Int. Cl.[7] ............................................... B65D 19/00
(52) U.S. Cl. .................. 248/678; 248/346.01; 248/633; 108/55.3; 108/51.11
(58) Field of Search ................. 248/146, 678, 248/633, 671, 346.01, 188.1, 548; 52/309.4; 108/55.3, 57.28, 51.11, 901

(56) References Cited

U.S. PATENT DOCUMENTS

| | | |
|---|---|---|
| 994,822 A | 6/1911 | Daly |
| 2,363,256 A | 11/1944 | Manning et al. ............... 220/15 |
| 2,620,748 A | 12/1952 | Shields ........................ 105/366 |
| 2,674,206 A | 4/1954 | Scott ........................... 105/369 |
| 3,131,648 A | 5/1964 | Seger .......................... 105/369 |
| 3,229,825 A | 1/1966 | Brown, Jr. .................. 214/10.5 |
| 3,336,069 A | 8/1967 | Bayer et al. .................. 296/24 |
| 3,462,027 A | 8/1969 | Puckhaber ................. 214/10.5 |
| 3,511,191 A * | 5/1970 | Barry, Jr. et al. ............. 108/58 |
| 3,575,403 A | 4/1971 | Hamel ......................... 267/63 |
| 3,581,674 A | 6/1971 | O'Leary ..................... 105/367 |
| 3,612,301 A | 10/1971 | Peacock ................. 214/10.5 R |
| 3,719,342 A * | 3/1973 | Kupersmit .................. 248/216 |
| 3,861,326 A * | 1/1975 | Brown ......................... 108/51 |
| 3,872,799 A | 3/1975 | Dousset ...................... 105/492 |
| 3,880,092 A * | 4/1975 | Seeber et al. ................. 108/55 |
| 4,008,669 A | 2/1977 | Sumrell ...................... 105/484 |
| 4,247,237 A | 1/1981 | Brown ........................ 410/154 |
| 4,572,716 A | 2/1986 | West ............................ 410/36 |
| 4,832,196 A * | 5/1989 | Butler ........................ 206/391 |
| 4,854,792 A | 8/1989 | Cottone ...................... 410/118 |
| 4,971,275 A * | 11/1990 | Roberts ...................... 248/152 |
| 5,161,703 A * | 11/1992 | Patton ........................ 211/294 |
| D345,845 S * | 4/1994 | Strzegowski, Jr. ........... D34/38 |
| 5,433,156 A * | 7/1995 | Hutchinson ................ 108/51.3 |
| 5,687,652 A * | 11/1997 | Ruma ......................... 108/561 |
| 5,769,003 A * | 6/1998 | Rose et al. ................. 108/55.3 |
| 5,934,467 A * | 8/1999 | Gilfert et al. ............... 206/391 |
| 6,079,580 A * | 6/2000 | Garton et al. ................ 220/1.5 |

FOREIGN PATENT DOCUMENTS

| | | | |
|---|---|---|---|
| DE | 28 35 219 | 2/1980 | ............. B65J/1/24 |
| SU | 779-129 | 11/1980 | ............ B61D/3/16 |
| SU | 958-262 A | 9/1982 | .......... B65D/85/20 |

* cited by examiner

Primary Examiner—Anita King
Assistant Examiner—Steven Marsh
(74) Attorney, Agent, or Firm—Baniak Pine & Gannon

(57) ABSTRACT

A cushioning and stabilizing support in the form of a cradle for supporting heavy paper coils or rolls has a load bearing surface which flexes under loading to embrace and protect the roll. The cradle is preferably configured so that the center of gravity of the roll is aligned with the midpoint of the cradle, providing optimum load-bearing capacity and protection.

25 Claims, 3 Drawing Sheets

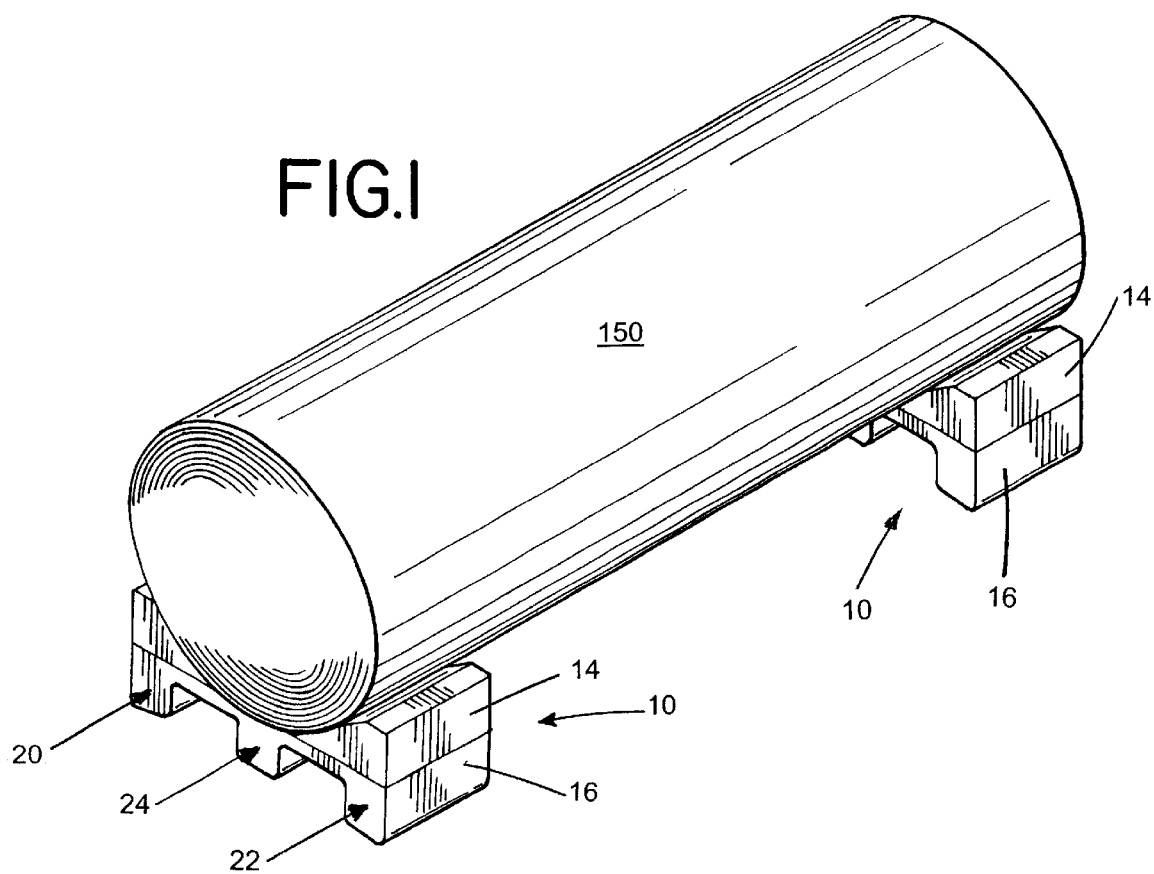

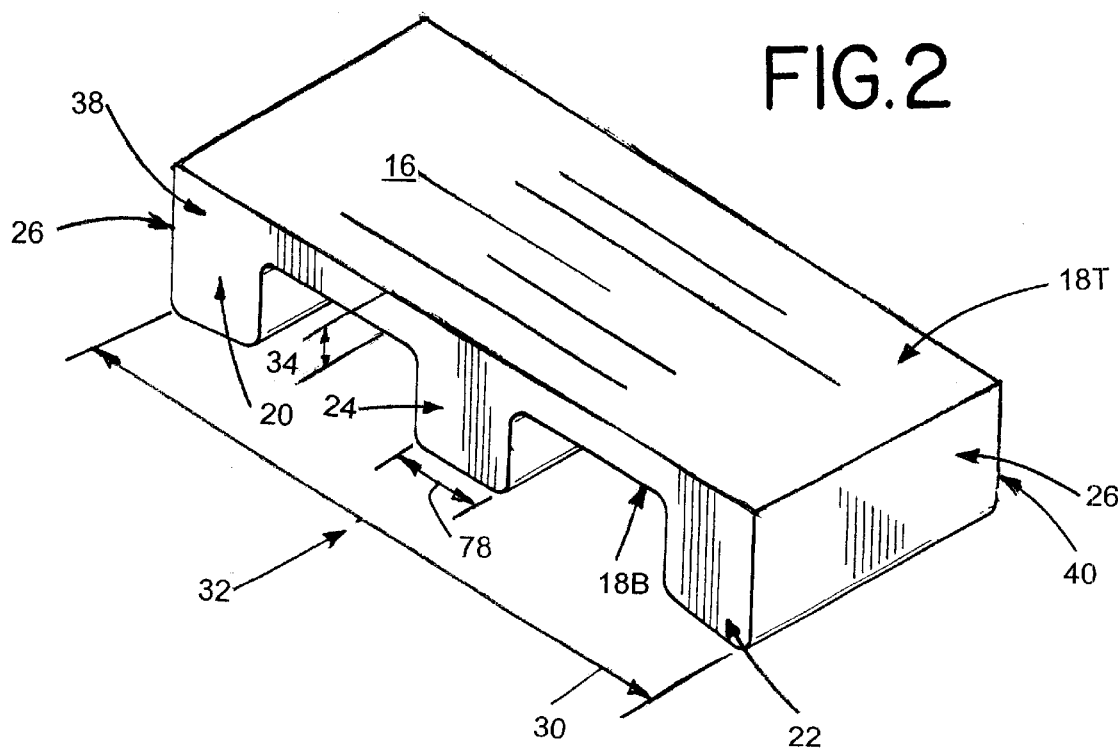
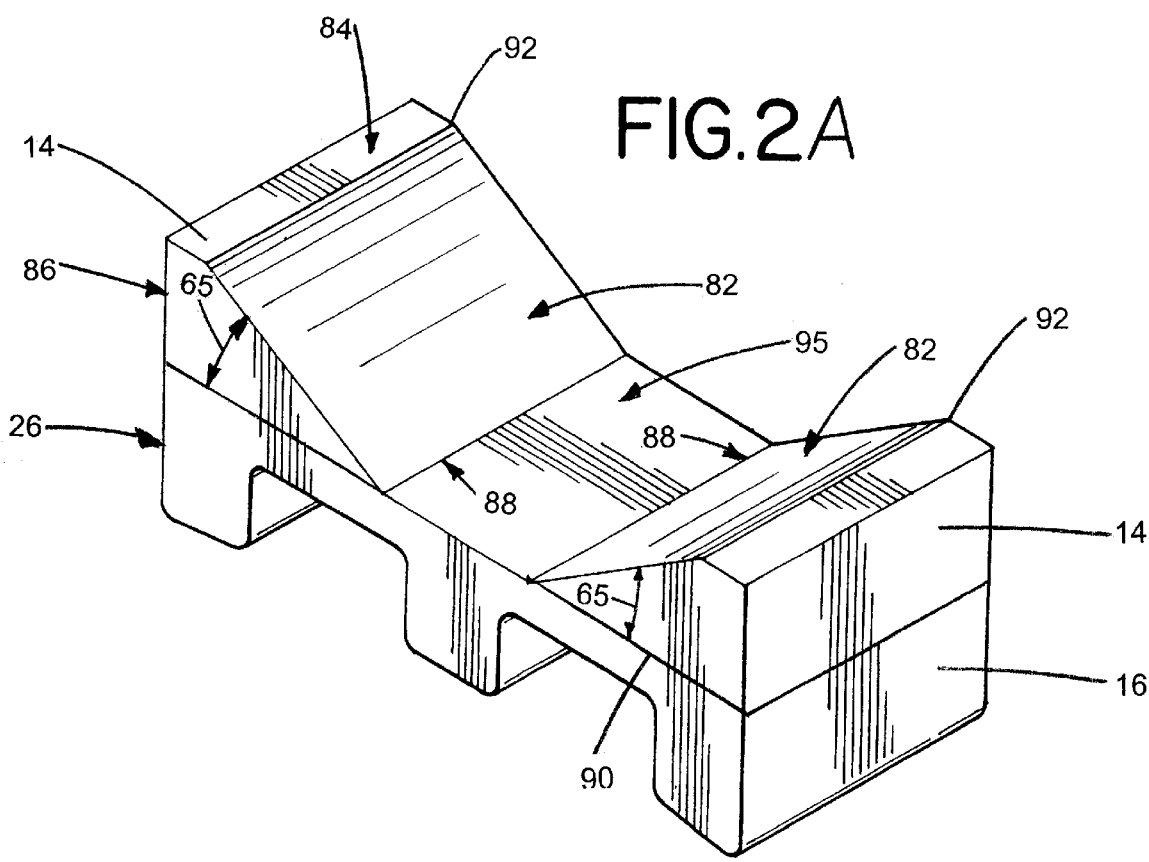

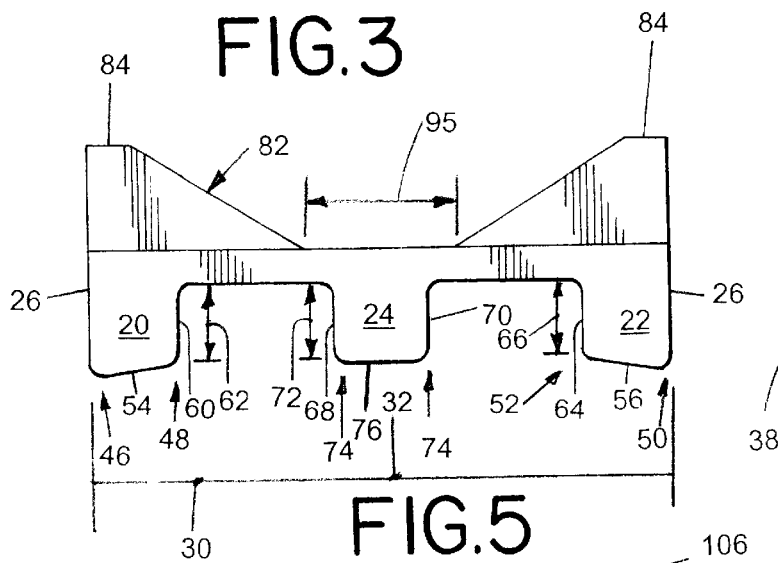
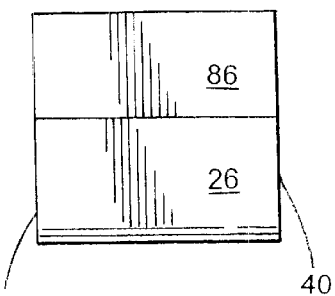
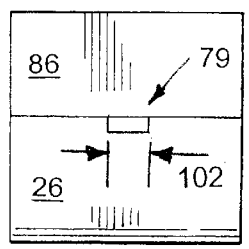
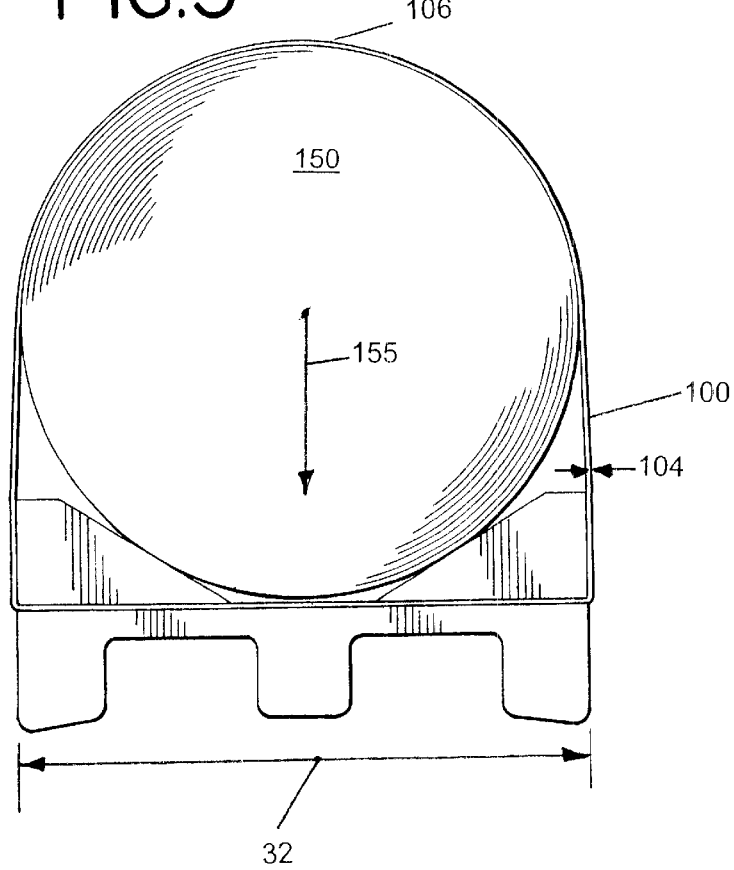

HIGH LOAD CAPACITY CRADLE PARTICULARLY FOR ROLLS AND COILS

PRIORITY CLAIM

This application claims priority to provisional application U.S. Ser. No. 60/157,971 filed Oct. 6, 1999.

FIELD OF THE INVENTION

This invention generally relates to cushioning and stabilizing heavy loads, and more specifically pertains to preventing damage to heavy rolls or coils, such as, for example, paper rolls.

DISCUSSION OF THE PRIOR ART

There has been a long felt need for safely shipping heavy, cumbersome loads that are generally cylindrical in shape. A specific example would be a roll of paper, which by industry standards, typically measures up to 42 inches in diameter and is about 10 to 12 feet in length. A paper roll of this size would weigh about 10,000 to 15,000 pounds and it should be obvious that such a large object, even under the most modest acceleration, would exhibit an extremely significant quantity of stored kinetic energy. Such heavy elongated rolls must furthermore be adequately supported so as not to sag or otherwise become out-of-round. Thus, a well-engineered support system is required to safely store, move, and ship such rolls, otherwise, they will or can be very easily damaged.

A problem with many support systems currently available is that they are typically made of materials which may scratch or otherwise leave permanent indentations in the surface of the roll. An example would be a cradle that is constructed from wood. Furthermore, wood cradles typically have a very short service life as a result of rough handling. Another problem is that most cradles fail to provide an included means for lifting the cradle and the roll as a unit so that the roll can be shipped without providing a separate lifting device at each destination where the roll is to be shipped or moved.

Moreover, even when large rolls are adequately secured, contact with another roll during movement will usually cause one or both of the rolls to become dented or out-of-round. Thus, a related problem with most conventional cradles is that they may fail to provide some form of protection against travel of the roll. A typical solution in this regard is to provide a separate spacer cushion for insertion in between sets of rolls as a means for preventing damage from one roll contacting the other during shipment or storage. Such spacer cushions add additional cost to ship the product, not only because of the cost of the cushions themselves, but also because of the labor time in setting the spacer cushions between the rolls. Thus, in this respect, it can be appreciated that many of the current cradle devices fail to perform a protection function with respect to movement of the rolls in transport.

Therefore, there is still a need for an improved bracing and supporting system for use in transporting or storing heavy rolls, especially metal and paper rolls, in order to overcome the difficulties with the prior art as mentioned above.

SUMMARY OF THE INVENTION

It is a primary object of the invention to provide a load support for supporting a load having a curved exterior, which comprises a base having a top and bottom, the top having a load-engaging surface, the bottom having a pair of laterally spaced outer portions or feet, and an intermediate portion, or foot, disposed between the outer portions. In one embodiment, each outer foot has an outboard heel and an inboard heel, the outboard heels being on a same first horizontal plane and the inboard heels being on a same second horizontal plane. The inboard heels are disposed above the first horizontal plane. The intermediate foot is also disposed above the first horizontal plane in this preferred form, although it need not be. When a load is placed upon the load-engaging surface of the base, the base flexes, such that the inboard heels of each outer foot become co-planar with the outboard heels, the intermediate foot becomes co-planar with the outer feet, and the load-engaging surface curves to embrace the curved exterior of the load.

The load support of this preferred embodiment has the load-engaging surface formed of first and second opposed and identical generally linear-sloped parts, and a generally planar intermediate section disposed between the sloped parts. The intermediate section is in a plane that is generally parallel to and above the first and second horizontal planes. Each of the sloped parts has a tapering surface that preferably slopes downwardly toward the intermediate section.

Most preferably, the feet are equidistantly spaced apart, and the intermediate foot is centered under the longitudinal extent of the intermediate section so that the loading on the support is through a center of the load support. Each sloped part flexes towards the other when a load is placed upon the load bearing surfaces, and the intermediate section flexes downwardly when a load is placed upon the load bearing surfaces.

It is another object of the invention to provide such a flexing load support made of a high density foam. The foam is rugged for a durable, long-lasting support. It also yields a somewhat resilient surface, which will not damage the roll being supported.

Most advantageously, while the foam support will deform to perform its load-supporting function, it will then substantially return to its original shape upon removal of the load. The foam construct can also be provided with a rubberized surface to further enhance its grasping and stabilizing abilities. A strap can additionally be used as part of the cradle support to wrap the roll in place on the cradle.

It should be noted that, while the invention is described hereafter with respect to an embodiment using feet, it is not necessarily so limited in application. The material (e.g., foam) of the cradle may be selected to provide a planar bottom to the base, for instance, such that as the roll settles on the cradle, the roll settles into it, and the outside portions still provide the flexing and grasping functions in compression. Use of discrete feet, however, has the advantage of providing slots for receiving tines of a forklift so that the roll and its support system can be lifted as one.

The features and advantages of the invention will be further understood upon consideration of the following detailed description of an embodiment of the invention taken in conjunction with the drawings, in which:

DETAILED DESCRIPTION OF THE DRAWINGS

FIG. 1 is an isometric view showing a paper roll carried by the cradle system of the present invention;

FIG. 2 isometric view of the bottom section of the cradle;

FIG. 2A is an isometric view showing a complete cradle of the present invention;

FIG. 3 front elevational view of the cradle of the present invention;

FIG. 4 view of the cradle of the present invention;

FIG. 4A is a cradle end view showing a groove for receiving a strap; and

FIG. 5 is a front elevational view of the present invention showing the load being secured by an anchoring strap.

DETAILED DESCRIPTION OF A PREFERRED EMBODIMENT

In FIG. 1, a paper roll 150 is seen being supported at each of its ends by a respective load support 10 of the present invention. While a paper roll is described herein, other types of loads other than paper rolls are contemplated. Moreover, although the load disclosed herein includes a curved exterior, other shapes and configurations are contemplated, although the present embodiment of the load support 10 is particularly suited for engaging such curved surfaces.

The load supports 10 are identical, and are described in greater detail when viewing FIGS. 2–4. The load support 10 in this embodiment is comprised of a base which is generally formed from a top section 14 (two pieces) and a bottom section 16. The bottom section 16 is of an extent or length 30 (see FIG. 3) which is defined by the distance between the end surfaces 26. Referring to FIG. 2, the distance between the top surface 18T and bottom surface 18B defines a thickness 34 of bottom section 16, while the distance between the front surface 38 and the back surface 40 defines a width of the bottom section. Downwardly depending from the bottom surface 18B are three feet members 20, 22 and 24.

Referring to FIG. 3 in particular, the first outside foot member 20 has a first outside corner 46 and a second inside corner 48. An inclined base surface 54 extends between corners 46 and 48. The second outside foot member 22 is identical to the first foot member 20. The second outside foot 22 also has an outside corner 50, an inside corner 52, and a base surface 56 which is inclined at the same angle as the first outside foot member 20. The intermediate foot 24 is located equidistantly spaced from the first and second feet 20, 22. The intermediate foot 24 includes the base surface 76 extending between a first wall 68 and a second wall 70, each of which includes a corner 74. The first and second walls 68, 70 are identical in height, indicated at 72. The height 72 is identical to the height 62 and 66, respectively, of an inside wall 60 of the first foot, 20, and an inside wall 64 of the second foot 22. The intermediate foot 24 has an extent or thickness 78 (see FIG. 2) which is defined as the longitudinal distance between walls 68 and 70. The longitudinal extent or thickness of each of the above-described feet 20, 22 and 24 are identical to the other.

As illustrated in FIG. 2A, the top section 14 has two identical parts that are attached to bottom section 16. Each part includes a downward and linearly tapering upper surface 82 which begins at an edge 92 and terminates at tip 88. The bottom surface 90 of each part is glued or otherwise welded/formed to the top surface 18T of bottom section 16 such that end surface 86 is coextensive to end surface 26 on bottom section 16. Each part also includes an upper horizontal surface 84 which has a horizontal extent that is defined by the distance between end surface 86 and the edge 92. As FIG. 3 best shows, the tip 88 of each sloped surface 82 terminates at a position short of the midpoint 32. The midpoint 32 represents a longitudinal midpoint between end surfaces 26. The midpoint 32 further represents a longitudinal midpoint of the intermediate foot 24. The longitudinal distance between tips 88 defines the planar intermediate surface 95, which is actually a part of the top surface 18T.

The surfaces 82 of the two sloped parts and the intermediate surface 95 collectively form the load engaging surface of the load support 10. The slope and extent of the intermediate surface may preferably be selected to create a load bearing surface that, in this embodiment, is most favorable for protecting the large circular paper rolls 150 and ensuring that the center of gravity of the roll (CG) will be disposed over the midpoint 32 of the load support, and to provide the embracing feature of the invention, as will be explained later.

As mentioned above, the left and right sloped parts 14 are formed as separate members that later are attached to the bottom section 16 by gluing, adhesion bonding or even by molding each part and the bottom section 16 as one integral member. A preferred form of construction is through laminating vertically oriented slabs of 9 pound density polyethylene foam, as by flame bonding. One such foam is sold by Tenneco, Inc. of 1900 Westfield Court, Lake Forest, Ill., under the name "Valcour." Polypropylene, polystyrene and any number of flexible polyolefin materials could likewise be used, as could non-foam but similar materials.

After the load support 10 is formed, the load bearing surface that will receive the face of the paper roll 150, may furthermore be provided with a rubberized or elastomeric coating that is applied to the surface 82 (on each sloped part) and the surface 95, as an additional measure for preventing slippage between the roll 150 and the load support 10.

Referring to FIG. 5, a securing strap or belt 100 is shown incorporated between the top section 14 and bottom section 16 so that the strap can be fastened and connected around the outside surface of roll 150. The strap 100 may be made of nylon or another material such as leather, etc., which exhibits high tensile strength characteristics. As FIG. 4A shows, the top surface 18T is provided with a groove 79 for receiving the strap 100. The groove 79 extends across the entire bottom section 16, although this aspect is not shown. The groove 79 has a width 102 and a depth 104 adapted to receive the belt 100. The. belt 100 may be provided with a variety of different types of fastening means 106 for connecting the belt ends together after the belt 100 is secured about the roll 150.

In operation, when a roll 150 is received within the load support 10, the load bearing surfaces 82 and 95 are located to position the center of the roll 150 in vertical alignment with the center or midpoint 32 of the base (see arrow 155 in FIG. 5). Centering the load at midpoint 32 also centers the load through the middle of the intermediate foot 24.

When the roll 150 is received in the load support 10, the weight of the roll will cause each of the load bearing surfaces 82 and 95 to deflect. The load bearing surface 95 will deflect down, while load bearing surfaces 82 will deflect toward each other. The deflection of these surfaces 82, 95, causes the top section 14 to effectively embrace the outer surface of the roll 150. The intermediate foot 24 will move downwardly such that base surface 76 will now be on the same horizontal plane as the base surfaces 54 and 56 of the first and second outside feet 20, 22. Additionally, the formerly inclined surfaces 54, 56 of the outer feet 20, 22 will have deflected and flattened as they each make full contact against the ground surface on which the load support 10 is resting. A downward deflection of foot 24 causes surface 76 to touch the ground. Thus, all three feet are supporting the weight of roll 150.

After the load support member 10 is loaded, the belt 100 may be used to further secure the roll 150 and prevent roll movement while it rests within the load support 10. A roll 150 that is supported at each end (and through use of as many intermediate supports 10 as deemed advisable), is then secured with the straps 100, and is capable of being moved with the load supports 10 as a unit. Moving the roll 150 and load supports 10 as a unit can be accomplished by inserting a cable lifting system underneath the load support 10, specifically in the open areas between each of the feet 20, 22, 24, or through use of forklifts in the same open areas.

While the invention has been described with regard to a preferred embodiment of this invention, this invention is not limited to that embodiment, and changes can be made without departing from the scope of this invention, which is defined in the appended claims. Thus, for example, while an intermediate foot 24 is described above which is at a plane higher than the lowermost part of feet 20, 22, it could be coplanar. The weight of the load and the foam selected could result in compression of the middle portion of the cradle 10, and commensurate deflection of the top section to embrace the load. So too, the entire cradle could have a constant rectangular cross-section, yet be formed of "softer" foam (or other compressible/resilient material) in the middle portion, with stiffer material laterally thereof. Again, the middle would be subject to compression and the sides would embrace the load.

What is claimed is:

1. A load support for a load having a curved exterior, comprising:

a base having a top and a bottom section, the top section having a load-engaging surface, the bottom section having a pair of laterally spaced outer feet and an intermediate foot disposed between the outer feet, each outer foot having an identical outboard heel and an inboard heel, the outbound heels being on a same first horizontal plane and the inboard heels being on a same second horizontal plane that is disposed above the first horizontal plane, the intermediate foot disposed above the first horizontal plane, whereby a load placed upon the load-engaging surface causes the base to flex such that the inboard heels of each outer foot become co-planar with the outboard heels, the intermediate foot becomes co-planar with the outer feet, and the load-engaging surface curves to embrace and protect the curved exterior of the load.

2. The load support of claim 1 wherein the load-engaging surface is formed of first and second opposed and identical linear-sloped parts and a planar intermediate section disposed between the sloped parts, the intermediate section disposed in a plane that is generally parallel to and above the first and second horizontal planes, the intermediate section defined by an extent between the sloped parts, wherein each of the sloped parts have tapering surfaces that slope downwardly toward the intermediate section.

3. The load support of claim 1 wherein the intermediate foot and the outer feet are equidistantly spaced apart.

4. The load support of claim 2 wherein the intermediate foot is centered under the horizontal extent of the intermediate section so that loading forces on the load support will be directed through a longitudinal midpoint of the load support.

5. The load support of claim 2 wherein the first and second sloped parts include a respective horizontally planar section, each respective planar section associated with a respective outer foot.

6. The load support of claim 1 wherein each outer foot includes a tapering surface extending between the inbound and outbound heels, the tapering surface upwardly inclined at an acute angle from the outside heel towards the inside heel.

7. The load support of claim 6 wherein the tapering surfaces of the outside feet become co-planar with the first horizontal plane when the load is received on the load support.

8. The load support of claim 7 wherein the tapering surface forms an acute angle with respect to the first horizontal plane.

9. The load support of claim 5 wherein the linear-sloped parts taper downwardly from the horizontally planar section to the tip, the taper forming an acute angle with respect to the horizontal face.

10. The load support of claim 9 wherein the acute angle of the sloped part is between 35–75 degrees.

11. The load support of claim 10 wherein each sloped part flexes towards the other when a load is placed upon the load bearing surface.

12. The load support of claim 11 wherein the intermediate section flexes downwardly when a load is placed upon the load bearing surface.

13. The load support of claim 12 wherein the intermediate foot includes a bottom surface that is disposed parallel to and on the same second horizontal plane.

14. The load support of claim 2 wherein a center of gravity of the load is in vertical alignment with a longitudinal midpoint of the load support.

15. The load support of claim 1 wherein the top and bottom sections are laminated together to form an integral base.

16. The load support of claim 15 wherein the top and bottom sections are made from a high density elastomeric foam having about a nine pound density.

17. A method of supporting a load, comprising:

providing a load support that is formed of a top section which defines a load engaging surface, and a bottom section which includes an intermediate foot and two outer feet, wherein said intermediate foot of said bottom section is shorter relative to said outer feet, said intermediate foot having a planar bottom surface and said outer feet having identically sloped bottom surfaces, wherein all bottom surfaces touch a ground surface when said load engaging surface moves downwardly;

placing a load within said load support such that said load engaging surface moves downwardly with each of said feet sharing a portion of the load while resting on the ground surface.

18. A load support for a heavy load, comprising:

a base having a top and a bottom and lateral sides, said top having a load-engaging surface, said base bottom being defined by first and second outboard feet located adjacent a respective lateral side, and an intermediate foot between said outboard feet, said outboard feet are coplanar in a first horizontal plane and said intermediate foot being located in a first unloaded height in a second horizontal plane which is above said first horizontal plane said base having a middle portion which decreases from said first unloaded height to a second loaded height upon a heavy load being placed upon said load-engaging surface, while said lateral sides are subjected to an inwardly directed force toward said load, said load-engaging surface thereby forming a well embracing said load upon said load-engaging surface.

19. The load support of claim 18 wherein said outboard feet have a sloped bottom part which slopes inwardly and upwardly.

20. A load support for a heavy load, comprising:

a base having a top and a bottom and lateral sides, said top having a load-engaging surface, said load-engaging surface having a generally concave shape, said base bottom being defined by first and second outboard feet located adjacent a respective lateral side, and an intermediate foot between said outboard feet, said outboard feet are coplanar in a first horizontal plane and said intermediate foot being located in a first unloaded height in a second horizontal plane which is above said first horizontal plane;

said base having a middle portion which decreases from said first unloaded height to a second loaded height upon a heavy load being placed upon said load-engaging surface, while said lateral sides are subjected to an inwardly directed force toward said load, said load-engaging surface thereby forming a well embracing said load upon said load-engaging surface.

21. The load support of claim 20 wherein said outboard feet have a sloped bottom part which slopes inwardly and upwardly.

22. The load support of claim 21 wherein said outboard and intermediate feet define spaces there between adapted to receive lifting forks of a forklift.

23. The load support of claim 22 wherein said base is made of a resilient compressible material.

24. The load support of claim 23 wherein said material is a high density foam.

25. The load support of claim 24 wherein said material is a first high density foam located in said middle portion and a second high density foam located laterally outboard from said middle portion, said second foam being of a higher density than said first foam.

* * * * *

UNITED STATES PATENT AND TRADEMARK OFFICE
CERTIFICATE OF CORRECTION

PATENT NO. : 6,550,741 B1
DATED : April 22, 2003
INVENTOR(S) : Mark A. Cottone

It is certified that error appears in the above-identified patent and that said Letters Patent is hereby corrected as shown below:

Column 6,
Line 54, please replace "are" with -- being --.

Column 7,
Line 8, please replace "are" with -- being --.

Signed and Sealed this

Eleventh Day of November, 2003

JAMES E. ROGAN
*Director of the United States Patent and Trademark Office*